(12) United States Patent
Holz

(10) Patent No.: US 10,936,145 B2
(45) Date of Patent: *Mar. 2, 2021

(54) DYNAMIC INTERACTIVE OBJECTS

(71) Applicant: Ultrahaptics IP Two Limited, Bristol (GB)

(72) Inventor: David S. Holz, San Francisco, CA (US)

(73) Assignee: Ultrahaptics IP Two Limited, Bristol (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/848,696

(22) Filed: Apr. 14, 2020

(65) Prior Publication Data

US 2020/0241728 A1 Jul. 30, 2020

Related U.S. Application Data

(63) Continuation of application No. 14/281,825, filed on May 19, 2014, now Pat. No. 10,620,775.

(60) Provisional application No. 61/824,674, filed on May 17, 2013.

(51) Int. Cl.
*G06F 3/048* (2013.01)
*G06F 3/0481* (2013.01)

(52) U.S. Cl.
CPC ................ *G06F 3/04812* (2013.01)

(58) Field of Classification Search
CPC ............. G06F 3/04812; G06F 3/048
See application file for complete search history.

(56) References Cited

U.S. PATENT DOCUMENTS

| 5,901,170 A | 5/1999 | Peysakhovich et al. |
| 6,266,061 B1* | 7/2001 | Doi ............... G06F 3/017 345/156 |
| 6,901,170 B1 | 5/2005 | Terada et al. |
| 7,886,236 B2 | 2/2011 | Kolmykov-Zotov et al. |
| 8,230,852 B2 | 7/2012 | Zhang et al. |
| 8,235,529 B1 | 8/2012 | Raffle et al. |
| 8,643,628 B1* | 2/2014 | Eriksson ............ G06F 3/017 345/175 |
| 8,930,852 B2 | 1/2015 | Chen et al. |

(Continued)

OTHER PUBLICATIONS

U.S. Appl. No. 14/281,825—Office Action dated Feb. 11, 2016, 19 pages.

(Continued)

*Primary Examiner* — Jeanette J Parker
(74) *Attorney, Agent, or Firm* — Haynes Beffel & Wolfeld LLP; Paul A. Durdik; Andrew L. Dunlap

(57) ABSTRACT

Aspects of the systems and methods are described providing for modifying a presented interactive element or object, such as a cursor, based on user-input gestures, the presented environment of the cursor, or any combination thereof. The color, size, shape, transparency, and/or responsiveness of the cursor may change based on the gesture velocity, acceleration, or path. In one implementation, the cursor "stretches" to graphically indicate the velocity and/or acceleration of the gesture. The display properties of the cursor may also change if, for example, the area of the screen occupied by the cursor is dark, bright, textured, or is otherwise complicated. In another implementation, the cursor is drawn using sub-pixel smoothing to improve its visual quality.

20 Claims, 4 Drawing Sheets

(56) References Cited

U.S. PATENT DOCUMENTS

| | | | |
|---|---|---|---|
| 9,056,396 | B1 | 6/2015 | Linnell |
| 9,436,288 | B2 | 9/2016 | Holz |
| 9,459,697 | B2 | 10/2016 | Bedikian et al. |
| 9,552,075 | B2 | 1/2017 | Holz |
| 9,927,880 | B2 | 3/2018 | Holz |
| 10,254,849 | B2 | 4/2019 | Holz |
| 10,459,530 | B2 | 10/2019 | Holz |
| 2003/0081141 | A1 | 5/2003 | Mazzapica |
| 2008/0059915 | A1 | 3/2008 | Boillot |
| 2009/0073117 | A1* | 3/2009 | Tsurumi ............ G06F 3/0481 345/158 |
| 2009/0109178 | A1 | 4/2009 | Kim et al. |
| 2009/0217211 | A1 | 8/2009 | Hildreth et al. |
| 2010/0102570 | A1 | 4/2010 | Boyd-Wilson et al. |
| 2010/0177049 | A1 | 7/2010 | Levy et al. |
| 2010/0235786 | A1* | 9/2010 | Maizels ............ G06F 3/011 715/810 |
| 2011/0066984 | A1 | 3/2011 | Li |
| 2011/0119640 | A1 | 5/2011 | Berkes et al. |
| 2011/0251896 | A1 | 10/2011 | Impollonia et al. |
| 2011/0306420 | A1* | 12/2011 | Nishimoto ............ A63F 13/42 463/36 |
| 2011/0316679 | A1 | 12/2011 | Pihlaja |
| 2012/0062558 | A1 | 3/2012 | Lee et al. |
| 2012/0079421 | A1 | 3/2012 | Arriola |
| 2012/0204133 | A1 | 8/2012 | Guendelman et al. |
| 2012/0218183 | A1* | 8/2012 | Givon ............ G06F 3/017 345/157 |
| 2012/0320080 | A1 | 12/2012 | Giese et al. |
| 2013/0191911 | A1 | 7/2013 | Dellinger et al. |
| 2013/0215059 | A1 | 8/2013 | Lim et al. |
| 2013/0222640 | A1 | 8/2013 | Baek et al. |
| 2013/0239059 | A1 | 9/2013 | Chen et al. |
| 2013/0307935 | A1 | 11/2013 | Rappel et al. |
| 2013/0321265 | A1 | 12/2013 | Bychkov et al. |
| 2014/0035946 | A1 | 2/2014 | Chang et al. |
| 2014/0082559 | A1 | 3/2014 | Suggs |
| 2014/0125813 | A1 | 5/2014 | Holz |
| 2014/0132555 | A1 | 5/2014 | Becouarn et al. |
| 2014/0134733 | A1 | 5/2014 | Wu et al. |
| 2014/0157135 | A1 | 6/2014 | Lee et al. |
| 2014/0201666 | A1 | 7/2014 | Bedikian et al. |
| 2014/0223385 | A1 | 8/2014 | Ton et al. |
| 2014/0240215 | A1 | 8/2014 | Tremblay et al. |
| 2014/0331185 | A1 | 11/2014 | Carls et al. |
| 2014/0340311 | A1 | 11/2014 | Holz |
| 2014/0344731 | A1 | 11/2014 | Holz |
| 2014/0344762 | A1 | 11/2014 | Grasset et al. |
| 2014/0375547 | A1* | 12/2014 | Katz ............ G06F 3/0346 345/156 |
| 2015/0003673 | A1 | 1/2015 | Fletcher |
| 2015/0084864 | A1 | 3/2015 | Geiss et al. |
| 2015/0153832 | A1 | 6/2015 | Krepec |
| 2015/0220150 | A1* | 8/2015 | Plagemann ............ G06F 3/017 715/856 |
| 2015/0227795 | A1 | 8/2015 | Starner et al. |
| 2016/0328022 | A1 | 11/2016 | Holz |
| 2017/0131784 | A1 | 5/2017 | Holz |

OTHER PUBLICATIONS

U.S. Appl. No. 14/281,817—Office Action, dated Sep. 28, 2015, 5 pages.
U.S. Appl. No. 14/154,730—Office Action dated Nov. 6, 2015, 9 pages.
U.S. Appl. No. 14/262,691—Office Action dated Dec. 11, 2015, 31 pages.
U.S. Appl. No. 14/155,722—Office Action dated Nov. 20, 2015, 14 pages.
U.S. Appl. No. 14/281,825—Office Action dated Aug. 25, 2016, 22 pages.
U.S. Appl. No. 14/281,825—Response dated Feb. 11 Office Action filed May 11, 2016, 12 pages.
U.S. Appl. No. 14/281,825—Response dated Aug. 25 Office Action filed Nov. 15, 2016, 12 pages.
U.S. Appl. No. 14/281,825—Office Action dated Jun. 2, 2017, 37 pages.
U.S. Appl. No. 14/281,825—Response to Office Action dated Jun. 30, 2017 filed , 16 pages.
U.S. Appl. No. 14/281,825—Office Action dated Oct. 13, 2017, 24 pages.
U.S. Appl. No. 14/281,825—Response to Office Action dated Oct. 13, 2017, filed Mar. 8, 2018, 14 pages.
U.S. Appl. No. 14/281,825—Office Action dated Jun. 27, 2018, 37 pages.
U.S. Appl. No. 14/281,825—Response to Office Action dated Jun. 27, 2018, filed Oct. 29, 2018, 11 pages.
U.S. Appl. No. 14/281,825—Office Action dated Feb. 21, 2019, 33 pages.
U.S. Appl. No. 14/281,825—Response to Office Action dated Feb. 21, 2019, filed Apr. 22, 2019, 14 pages.
U.S. Appl. No. 14/281,825—Office Action dated Jun. 18, 2019, 33 pages.
U.S. Appl. No. 15/213,899—Notice of Allowance dated Sep. 14, 2016, 8 pages.
U.S. Appl. No. 15/411,909—Notice of Allowance dated Feb. 27, 2017, 8 pages.
U.S. Appl. No. 15/411,909—Office Action dated Jun. 2, 2017, 16 pages.
U.S. Appl. No. 15/411,909—Response to Office Action filed Aug. 31, 2017, 7 pages.
U.S. Appl. No. 15/411,909—Notice of Allowance dated Nov. 22, 2017, 11 pages.
U.S. Appl. No. 15/933,199—Notice of Allowance dated Oct. 30, 2018, 25 pages.
U.S. Appl. No. 15/933,199—Corrected Notice of Allowance dated Jan. 17, 2019, 10 pages.
U.S. Appl. No. 16/377,072—Notice of Allowance dated Jun. 18, 2019, 25 pages.
U.S. Appl. No. 14/281,817—Response to Office Action dated Sep. 28, 2015 and filed Dec. 28, 2015, 8 pages.
U.S. Appl. No. 14/281,817—Notice of Allowance dated Apr. 22, 2016, 16 pages.
U.S. Appl. No. 14/281,817—Corrected Notice of Allowability dated Aug. 2, 2016, 9 pages.
U.S. Appl. No. 15/411,909—Preliminary Amendment filed May 24, 2017, 6 pages.
U.S. Appl. No. 14/281,825—Proposed Examiner's Amendment filed Nov. 15, 2019, 11 pages.
U.S. Appl. No. 14/281,825—Notice of Allowance dated Nov. 20, 2019, 18 pages.
U.S. Appl. No. 14/281,825—312 Amendment after Notice of Allowance filed Dec. 5, 2019, 10 pages.
U.S. Appl. No. 14/281,817—Notice of Allowance dated Apr. 22, 2016, 9 pages.
U.S. Appl. No. 15/213,899—Notice of Allowance dated Sep. 14, 2016, 7 pages.
U.S. Appl. No. 14/281,817—Notice of Allowance dated Aug. 2, 2016, 9 pages.
U.S. Appl. No. 14/281,817—Response dated Sep. 28 Office Action filed Dec. 28, 2015, 3 pages.
U.S. Appl. No. 15/411,909—Office Actiion dated Jun. 2, 2017, 16 pages.
U.S. Appl. No. 14/281,925—Office Action dated Jun. 2, 2017, 37 pages.
U.S. Appl. No. 15/411,909—Response to Office Actiion dated Jun. 2, 2017 filed Aug. 31, 2017, 7 pages.
U.S. Appl. No. 16/660,528—Notice of Allowance dated May 29, 2020, 9 pages.
U.S. Appl. No. 16/660,528—Notice of Allowance dated Sep. 22, 19 pages.
U.S. Appl. No. 14/281,825, filed May 19, 2014, U.S. Pat. No. 10,620,775, Apr. 14, 2020, Issued.
U.S. Appl. No. 14/281,817, filed May 19, 2014, U.S. Pat. No. 9,436,288, Sep. 6, 2016, Issued.

(56) References Cited

OTHER PUBLICATIONS

U.S. Appl. No. 15/213,899, filed Jul. 19, 2016, U.S. Pat. No. 9,552,075, Jan. 24, 2017, Issued.
U.S. Appl. No. 15/411,909, filed Jan. 20, 2017, U.S. Pat. No. 9,927,880, Mar. 27, 2018, Issued.
U.S. Appl. No. 15/933,199, filed Mar. 22, 2018, U.S. Pat. No. 10,254,849, Apr. 9, 2019, Issued.
U.S. Appl. No. 16/377,072, filed Apr. 5, 2019, U.S. Pat. No. 10,459,530, Oct. 29, 2019, Issued.
U.S. Appl. No. 16/660,528, filed Oct. 22, 2019, US-2020-0159334-A1, May 21, 2020, Pending.

* cited by examiner

DYNAMIC INTERACTIVE OBJECTS

RELATED APPLICATION

This application is a continuation of U.S. Nonprovisional application Ser. No. 14/281,825, entitled "Dynamic Interactive Objects", filed 19 May 2014, which claims the benefit of U.S. Provisional Application No. 61/824,674, titled "Dynamic Cursors", filed 17 May 2013. These applications are hereby incorporated by reference for all purposes.

FIELD OF THE TECHNOLOGY DISCLOSED

The technology disclosed generally relates to gesture recognition and, in particular, to providing visual feedback to users based on recognized gestures.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

Traditionally, users have interacted with electronic devices, such as a computer or a television, or computing applications, such as computer games, multimedia applications, or office applications, via indirect input devices, including, for example, keyboards, joysticks, or remote controllers. Electronics manufacturers have developed systems, however, that detect a user's movements or gestures and cause the display to respond in a contextually relevant manner. The user's gestures may be detected using an optical imaging system, and characterized and interpreted by suitable computational resources. For example, a user near a TV may perform a sliding hand gesture, which is detected by the gesture-recognition system; in response to the detected gesture, the TV may activate and display a control panel on the screen, allowing the user to make selections thereon using subsequent gestures; for example, the user may move her hand in an "up" or "down" direction, which, again, is detected and interpreted to facilitate channel selection.

Existing systems, however, provide limited feedback to users in response to their gestures, and users may find these systems frustrating and hard to use. A system that requires or allows many gestures, or complicated gestures, may have difficulty in distinguishing one gesture from another, and a user may accidentally issue one gesture-based command while intending another. Further, gesture-based presentation environments may be complicated, involving many objects, items, and elements, and the user may be confused as to what effect his gestures have or should have on the system. Hardly the "minority report" interface that we've all been promised.

A need therefore exists for improved technology for providing visual feedback to the user based on his or her gestures.

SUMMARY

Aspects of the technology described herein provide for modifying a presented (e.g., displayed on a screen, projected in space, holographically projected in space, etc.) interactive element or object, (e.g., a cursor, arrow, representation of a hand or other "real world" object, "window" associated with an operating system or other computer program, virtualized representation of one or more documents), based on user-input gestures, the environment of the presentation area or volume (e.g., cluttered with other objects, darkened, brightened, etc.), or any combination thereof. A presentation property (e.g., visual, such as the color, size, shape, transparency, or audio, such as volume, tone, and/or other, such as responsiveness) of the interactive object may be changed based on the gesture velocity, acceleration, or path. In an implementation employing a 2D display screen as the presentation medium, a cursor "stretches" to graphically indicate the velocity and/or acceleration of the gesture. The display properties of the cursor may be changed if, for example, the area of the screen (or volume of a 3D presentation space) occupied by the cursor is dark, bright, textured, or is otherwise complicated. In another implementation, the cursor is drawn using sub-pixel smoothing to improve its visual quality.

In one aspect, a system provides visual feedback in response to a gesture. An image-capture device obtains digital images of a real-world object in 3D space, and a computer memory stores a digital representation of a path of movement of the real-world object based on the captured images. A processor can execute computer code for changing a position of a presented interactive object in response to the movement of the real-world object and modifying a presentation property of the presented interactive object based on a property of the movement.

A display or other presentation device (e.g., projectors, holographic presentation systems, etc.) may display the interactive object. For example, the interactive object may be a cursor and the real-world object may be a hand of a user. Modifying the presentation property of the presented interactive object may include changing its color, size, shape, or transparency, stretching the object based on its velocity or acceleration, changing a color of the presented object based on its velocity or acceleration, or changing a color of the object based on a color, texture, or pattern of the screen area along the path. The property of the movement may include a velocity of the real-world object along the path, an acceleration of the real-world object along the path, or the screen area along the path. The property of the movement may include a latency between movement of the real-world object and movement of the presented interactive object. Modifying the presentation property of the presented interactive object can include stretching the presented object an amount related to the latency. Detecting that the path of movement does not correspond to a known gesture may cause the processor to perform modifying a presentation property of the presented interactive object comprises flashing a color. Detecting a presented element to which the presented interactive object is moving towards may cause the processor to perform changing a color of, or flashing, the presented interactive object the presented element.

In another aspect, a method for providing visual feedback in response to a gesture includes obtaining, using an image-capture device, digital images of a real-world object in 3D space; storing, in a computer memory, a digital representation of a path of movement of the real-world object based on the captured images; changing a position of a presented interactive object in response to the movement of the real-world object; and modifying a presentation property of the presented interactive object based on a property of the movement.

Advantageously, these and other aspects enable machines, computers and/or other types of intelligent devices, and/or other types of automata to obtain information about objects, events, actions, and/or users employing gestures, signals, and/or other motions conveying meaning and/or combinations thereof. These and other advantages and features of the implementations herein described, will become more apparent through reference to the following description, the accompanying drawings, and the claims. Furthermore, it is to be understood that the features of the various implementations described herein are not mutually exclusive and can exist in various combinations and permutations.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which.

DETAILED DESCRIPTION

Figure 1:
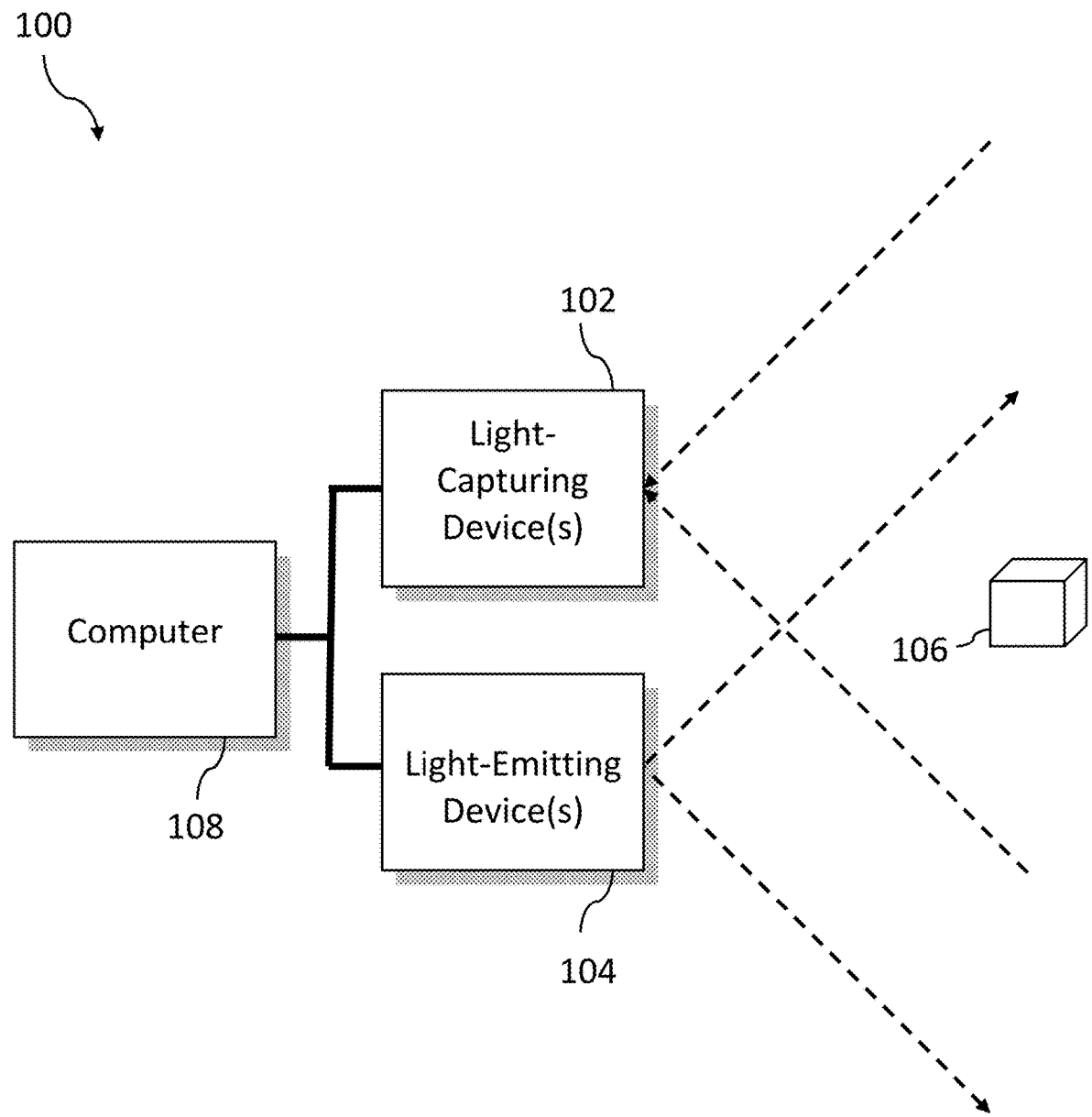
FIG. 1 is a simplified block diagram of an exemplary task environment in accordance with implementations of the technology disclosed.

A motion-capture system suitable to implement the disclosed technology can include a camera for acquiring images of an object; a computer for processing the images to identify and characterize the object; and a computer display for displaying information related to the identified/characterized object. A light source may also be included to illuminate the object. FIG. 1 illustrates an exemplary motion-capture system 100. The system 100 includes one or more light-capturing devices 102 (e.g., digital cameras or similar devices), each including an image sensor (e.g., a CCD or CMOS sensor), an associated imaging optic (e.g., a lens), and a window of transparent material protecting the lens from the environment. Two or more cameras 102 may be arranged such that their fields of view overlap in a viewed region. One or more light-emitting devices 104 may be used to illuminate an object 106 in the field of view. The cameras 102 provide digital image data to a computer 108, which analyzes the image data to determine the 3D position, orientation, and/or motion of the object 106 the field of view of the cameras 102.

The cameras 102 may be visible-light cameras, infrared (IR) cameras, ultraviolet cameras, or cameras operating in any other electromagnetic frequency regime. Preferably, the cameras 102 are capable of capturing video images. The particular capabilities of cameras 102 may vary as to frame rate, image resolution (e.g., pixels per image), color or intensity resolution (e.g., number of bits of intensity data per pixel), focal length of lenses, depth of field, etc. In general, for a particular application, any cameras capable of focusing on objects within a spatial volume of interest can be used. For instance, to capture motion of the hand of an otherwise stationary person, the volume of interest might be a cube of one meter in length. To capture motion of a running person, the volume of interest might have dimensions of tens of meters in order to observe several strides.

The cameras may be oriented in any convenient manner. In one embodiment, the optical axes of the cameras 102 are parallel, and in other implementations the optical axes of the cameras 102 are not parallel. As described below, each camera 102 may be used to define a "vantage point" from which the object 106 is seen; if the location and view direction associated with each vantage point are known, the locus of points in space that project onto a particular position in the camera's image plane may be determined. In some embodiments, motion capture is reliable only for objects in an area where the fields of view of cameras 102; the cameras 102 may be arranged to provide overlapping fields of view throughout the area where motion of interest is expected to occur. In other embodiments, the system 100 may include one or more light sources 104, and the cameras 102 measure the reflection of the light emitted by the light sources on objects 106. The system may include, for example, two cameras 102 and one light source 104; one camera 102 and two light sources 104; or any other appropriate combination of light sources 104 and cameras 102.

Figure 2:
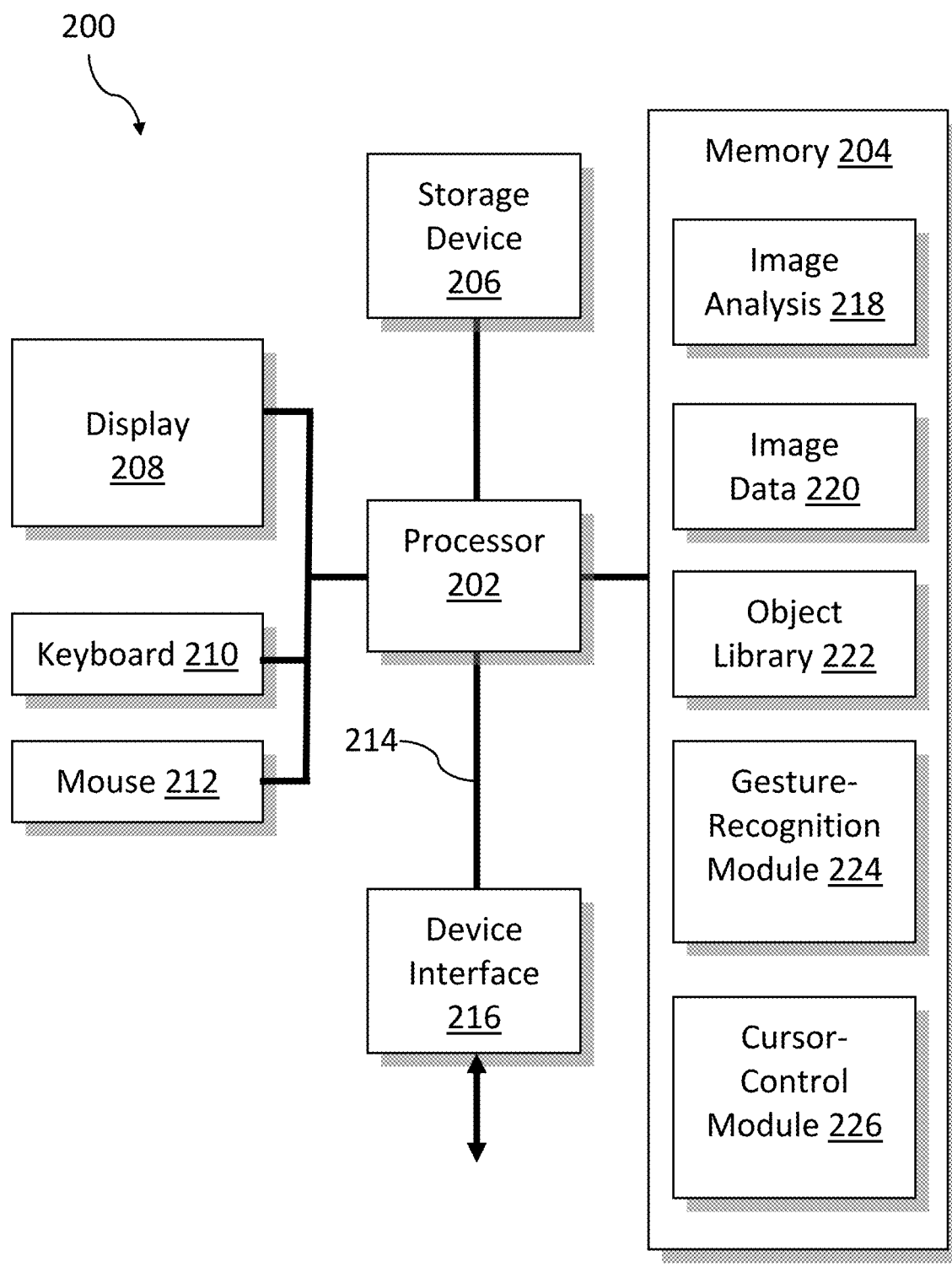
FIG. 2 is a simplified block diagram of an exemplary system for detecting a user gesture and modifying a cursor based thereon in accordance with implementations of the technology disclosed.

Computer 108 may generally be any device or combination of devices capable of processing image data using techniques described herein. FIG. 2 is a simplified block diagram of a suitably programmed general-purpose computer 200 implementing the computer 108 according to implementations of the technology disclosed. The computer 200 includes a processor 202 with one or more central processing units (CPUs), volatile and/or non-volatile main memory 204 (e.g., RAM, ROM, or flash memory), one or more mass storage devices 206 (e.g., hard disks, or removable media such as CDs, DVDs, USB flash drives, etc. and associated media drivers), a display device 208 (e.g., a liquid crystal display (LCD) monitor), user input devices such as keyboard 210 and mouse 212, and one or more buses 214 (e.g., a single system bus shared between all components, or separate memory and peripheral buses) that facilitate communication between these components.

The cameras 102 and/or light sources 104 may connect to the computer 200 via a universal serial bus (USB), FireWire, or other cable, or wirelessly via Bluetooth, Wi-Fi, etc. The computer 200 may include a camera interface 216, implemented in hardware (e.g., as part of a USB port) and/or software (e.g., executed by processor 202), that enables communication with the cameras 102 and/or light sources 104. The camera interface 216 may include one or more data ports and associated image buffers for receiving the image frames from the cameras 102; hardware and/or software signal processors to modify the image data (e.g., to reduce noise or reformat data) prior to providing it as input to a motion-capture or other image-processing program; and/or control signal ports for transmit signals to the cameras 102, e.g., to activate or deactivate the cameras, to control camera settings (frame rate, image quality, sensitivity, etc.), or the like.

The main memory 204 may be used to store instructions to be executed by the processor 202, conceptually illustrated as a group of modules. These modules generally include an operating system (e.g., a Microsoft WINDOWS, Linux, or APPLE OS X operating system) that directs the execution of low-level, basic system functions (such as memory allocation, file management, and the operation of mass storage devices), as well as higher-level software applications such as, e.g., a motion-capture (mocap) program 218 for analyzing the camera images to track the position of an object of interest and/or a motion-response program for computing a series of output images (or another kind of response) based on the tracked motion. Suitable algorithms for motion-capture program are described further below as well as, in more detail, in U.S. patent application Ser. No. 13/414,485, filed on Mar. 7, 2012 and Ser. No. 13/742,953, filed on Jan. 16, 2013, and U.S. Provisional Patent Application No. 61/724,091, filed on Nov. 8, 2012, which are hereby incorporated herein by reference in their entirety. The various modules may be programmed in any suitable programming language, including, without limitation high-level languages such as C, C++, C #, OpenGL, Ada, Basic, Cobra, Fortran, Java, Lisp, Perl, Python, Ruby, or Object Pascal, or low-level assembly languages.

The memory 204 may further store input and/or output data associated with execution of the instructions (including, e.g., input and output image data 220) as well as additional information used by the various software applications; for example, in some embodiments, the memory 204 stores an object library 222 of canonical models of various objects of interest. As described below, an object detected in the camera images may identified by matching its shape to a model in the object library 222, and the model may then inform further image analysis, motion prediction, etc.

In various embodiments, the motion captured in a series of camera images is used to compute a corresponding series of output images for display on the computer screen 208. For example, camera images of a moving hand may be translated into a wire-frame or other graphic depiction of the hand by the processor 202. Alternatively, hand gestures may be interpreted as input used to control a separate visual output; by way of illustration, a user may be able to use upward or downward swiping gestures to "scroll" a webpage or other document currently displayed, or open and close her hand to zoom in and out of the page. In any case, the output images are generally stored in the form of pixel data in a frame buffer, which may, but need not be, implemented in main memory 204. A video display controller reads out the frame buffer to generate a data stream and associated control signals to output the images to the display 208. The video display controller may be provided along with the processor 202 and memory 204 on-board the motherboard of the computer 200, and may be integrated with the processor 202 or implemented as a co-processor that manipulates a separate video memory. In some embodiments, the computer 200 is equipped with a separate graphics or video card that aids with generating the feed of output images for the display 208. The video card generally includes a graphical processing unit ("GPU") and video memory, and is useful, in particular, for complex and computationally expensive image processing and rendering. The graphics card may implement the frame buffer and the functionality of the video display controller (and the on-board video display controller may be disabled). In general, the image-processing and motion-capture functionality of the system may be distributed between the GPU and the main processor 202 in various conventional ways that are well characterized in the art.

The computer 200 is an illustrative example; variations and modifications are possible. Computers may be implemented in a variety of form factors, including server systems, desktop systems, laptop systems, tablets, smart phones or personal digital assistants, and so on. A particular implementation may include other functionality not described herein, e.g., wired and/or wireless network interfaces, media playing and/or recording capability, etc. In some embodiments, one or more cameras may be built into the computer rather than being supplied as separate components. Further, the computer processor may be a general-purpose microprocessor, but depending on implementation can alternatively be, e.g., a microcontroller, peripheral integrated circuit element, a customer-specific integrated circuit ("CSIC"), an application-specific integrated circuit ("ASIC"), a logic circuit, a digital signal processor ("DSP"), a programmable logic device such as a field-programmable gate array ("FPGA"), a programmable logic device ("PLD"), a programmable logic array ("PLA"), smart chip, or other device or arrangement of devices.

Further, while computer 200 is described herein with reference to particular blocks, this is not intended to limit the technology disclosed to a particular physical arrangement of distinct component parts. For example, in some embodiments, the cameras 102 are connected to or integrated with a special-purpose processing unit that, in turn, communicates with a general-purpose computer, e.g., via direct memory access ("DMA"). The processing unit may include one or more image buffers for storing the image data read out from the camera sensors, a GPU or other processor and associated memory implementing at least part of the motion-capture algorithm, and a DMA controller. The processing unit may provide processed images or other data derived from the camera images to the computer for further processing. In some embodiments, the processing unit sends display control signals generated based on the captured motion (e.g., of a user's hand) to the computer, and the computer uses these control signals to adjust the display of documents and images that are otherwise unrelated to the camera images (e.g., text documents or maps) by, for example, shifting or rotating the images.

In one embodiment, the system 200 displays an interactive object, such as a cursor, on the screen 208; a user may change the position, orientation, or other display property of the cursor on the screen 208 (in 2D or 3D space) by making a gesture with a real-world object, such as the user's hand, finger, other body part, an object held in the user's hand, or any other object. A gesture-recognition module 224 tracks the gesture and translates the gesture into a movement command; an interactive object presentation module 226 moves, rotates, or otherwise alters the appearance or responsiveness of the presentation of the interactive object accordingly. For example, if the user moves his or her hand to the left, the system moves the cursor on the screen to the left by virtue of operation of modules 224 and 226.

Figure 3:
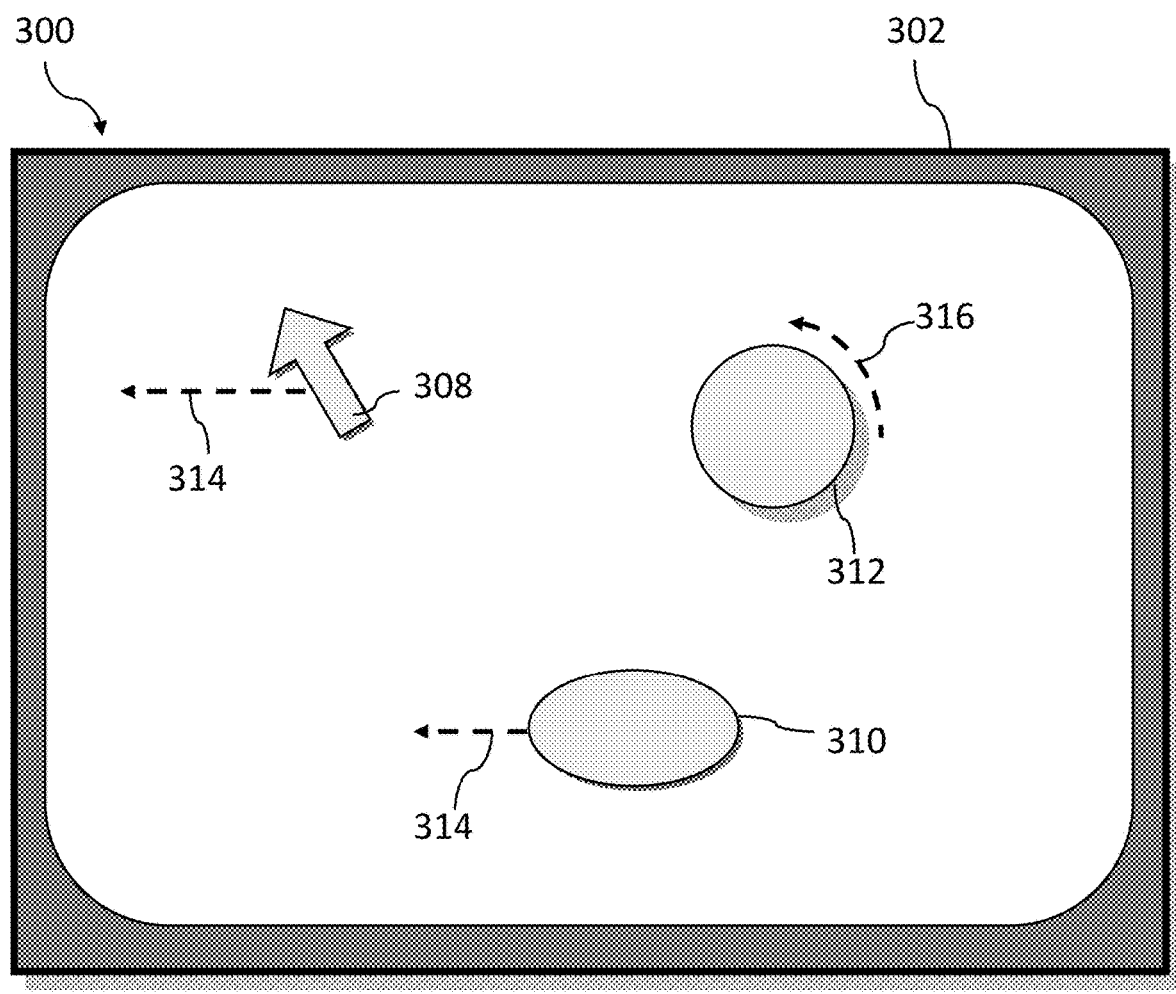
FIG. 3 illustrates various cursors and their relationship with user gestures in accordance with implementations of the technology disclosed.

The interactive object presentation module 226 may alter the appearance and/or behavior of the cursor based on a number of factors, including the velocity, acceleration, or path of the tracked gesture; the screen environment of the cursor; or the past or predicted future movement of the tracked object. As the term is used herein, "velocity" may mean a vector representing the speed and direction of motion of the gesture or simply the speed of the gesture. The cursor may be an arrow, circle, ellipse, or any other type of pointer or graphic; the cursor may also be a realistic or stylized representation of a user's hand, stylus, or other object. The technology disclosed is not limited to only cursors, however, and the implementations described herein may be used with other interactive elements, such as scrollbars, sliders, knobs, buttons, or any other type of interactive element. FIG. 3 illustrates a system 300 that includes a display 302 and a user's hand 304. When the hand 304 moves in a direction 306, exemplary cursors 308, 310, 312 correspondingly move. The cursor may be an "arrow"-style cursor 308, an ellipse 310, or any other shape; these cursors move on the screen 302 in a direction 314 corresponding to the direction of motion 306 of the hand 304. The amount presented motion 314 of the cursors 308, 314 may be equal to, less than, or greater than the amount of real-world motion 306 of the hand 304. In other implementations, the cursor may be another presented element, such as a dial 312 that exhibits other types of movement, such as a rotation 316, in response to movement of the hand 304.

In one implementation, the interactive object presentation module 226 changes the appearance of a cursor based on the velocity of the tracked object. For example, a first color may be assigned to the cursor, or a part of the cursor, when the tracked object is not moving, and a second color may be assigned to the cursor, or a part of the cursor, when the tracked object is moving above a threshold rate of speed. The first and second colors may be blended to varying degrees to represent intermediate rates of speeds as the object accelerates from not moving to above a threshold rate of speed. For example, the first color may be red which may gradually transition to green as the speed of the tracked object increases. In another embodiment, the color changes more quickly or instantly when the speed crosses a threshold. For example, the color may be red while the object is at rest or moving slowly to indicate to the user that no command is currently associated with the gesture; when the speed of the object passes the threshold, however, the color turns to green to indicate to the user that the gesture has been recognized and an associated command is thereupon executed by the system 200. More generally, the color of the cursor may change in response to any motion parameter associated with the presented object. Motion parameters includes velocity, acceleration, and changes in acceleration. A first color may denote an increase in a particular parameter while a second color indicates a decrease. The motion parameter illustrated by way of color changes may depend on instantaneous analysis of the gesture; for example, if the rate of acceleration crosses a threshold, the "acceleration" color scheme may replace the "velocity" color scheme. Furthermore, the term "color" is herein used broadly to connote intensity, hue, value, chroma or other property that may increase or decrease in accordance with the associated motion parameter.

In various implementations, multiple cursors are used to track multiple objects. For example a plurality of fingers on a user's hands may be tracked and each may have an associated cursor. The interactive object presentation module 226 applies different colors to some or all of the multiple cursors. For example, if a current application running on the system 200 uses only the index fingers of the user's hands as inputs, the interactive object presentation module 226 may display presented hand representations corresponding to the user's hands in which the index fingers of the presented hands are colored a first color (e.g., green) while the rest of the fingers are a second color (e.g., red). The interactive object presentation module 226 may change these color assignments if and when the application accepts input from other fingers. If the user is holding a stylus or other input device in his or her hand, the stylus may be colored a first color while the hand is colored a second color.

Figure 4:
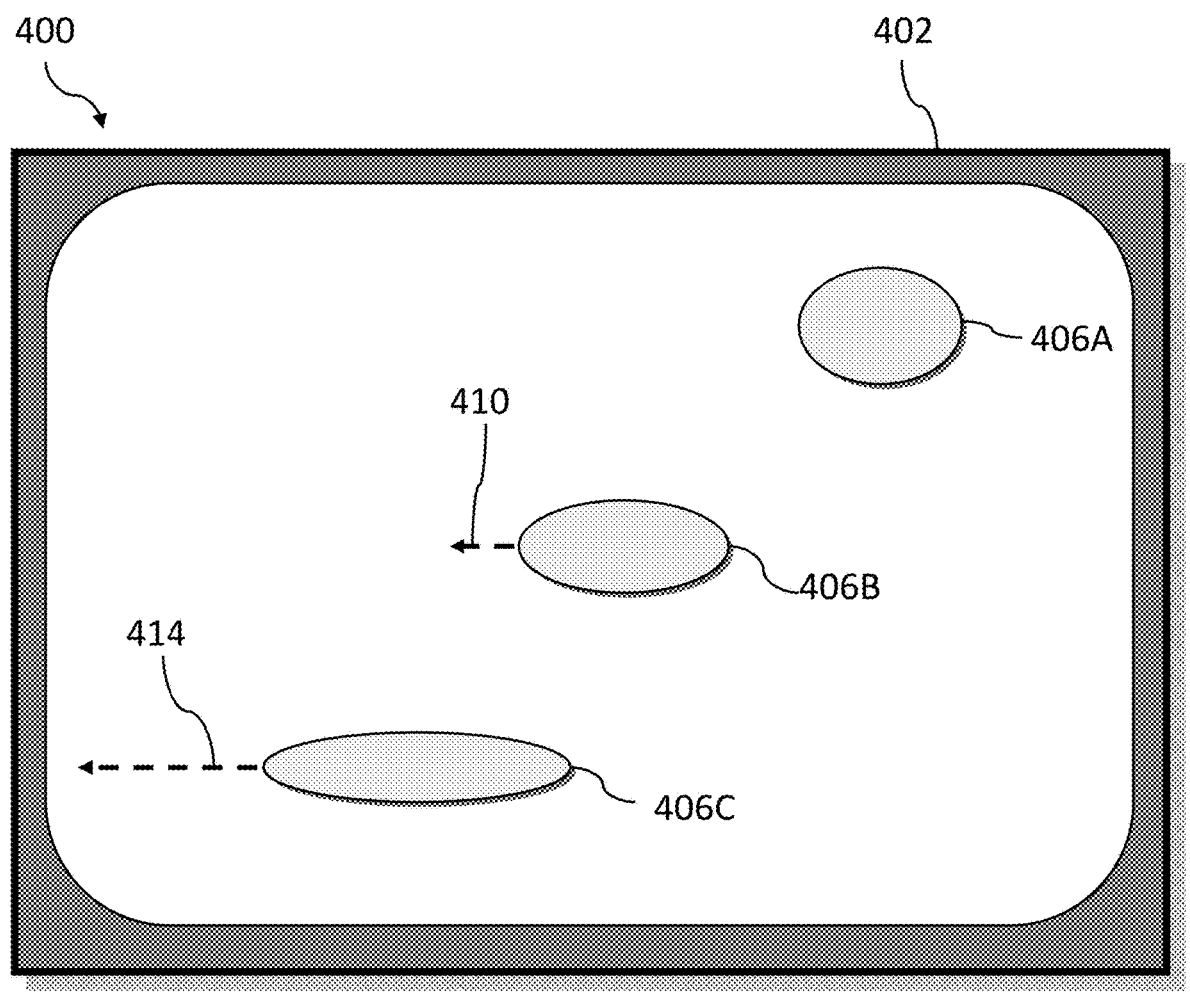
FIG. 4 illustrates various examples of cursor stretching in accordance with implementations of the technology disclosed.
Figure 4:
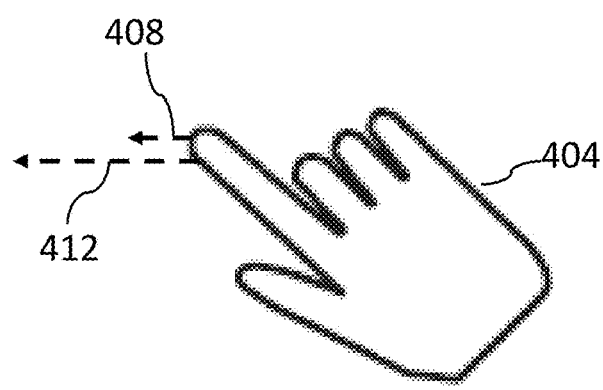

The interactive object presentation module 226 may change the color of the cursor when the gesture-recognition module 224 cannot recognize a user gesture. In implementations the cursor flashes a different color, for example red, if the user makes a gesture that the gesture-recognition module 224 cannot recognize. In addition, in implementations the interactive object presentation module 226 may change the color of the cursor based on the current use mode of the cursor. In an implementation, if the cursor is in a first mode, for example a "movement" mode where the user intends to move the cursor but not interact with any presented elements, the cursor may be a first color, and when the user is in a second mode, for example an "action" mode where the user intends to move, click on, or otherwise interact with a presented element, the cursor may be a second color. The interactive object presentation module 226 may select a current mode or transition to a different mode based on analysis of the user's pattern of action, in response to a command from a running application, or upon user command. The interactive object presentation module 226 may change the shape of the cursor in accordance with the motion, including velocity and/or acceleration, of the tracked object. In one implementation, the cursor "stretches" by expanding in size in one or more dimensions) in response to motion of the object. For example, the cursor may expand in a direction approximately opposite the direction of motion of the cursor, so that the user's motion seems to be stretching the cursor. The stretching may increase the size of the cursor (i.e., the screen area occupied by the user). In another implementation, as the cursor stretches in one direction, it shrinks in another dimension such that the total screen area occupied by the cursor remains approximately constant before, during, and after the stretching. The amount of stretching may be proportional to the velocity and/or acceleration; in one embodiment, stretching of the cursor occurs only after the velocity or acceleration of the object increases past a threshold. The amount stretching may be controlled only by the acceleration of the object, in which case constant-velocity motion of the object produces no stretching. When the object decelerates, the amount of stretching decreases until the cursor returns to the size it was at rest. In some embodiments, deceleration causes the cursor to shrink smaller than its size at rest. FIG. 4 illustrates a system 400 that includes a screen 402 and a user's hand 404; an ellipse-based cursor 406A stretches to a first new shape 406B in response to a first increase in velocity or acceleration 408 of the user's hand 404, and moves a corresponding amount 410. The first new shape 406B stretches to a second new shape 406C in response to further increases in velocity or acceleration 412 of the user's hand 404 and moves a greater amount 414. In this embodiment, the vertical dimension of the ellipses 406A, 406B, 406C decreases as the horizontal dimension increases, thereby maintaining a roughly constant area of the ellipses 406A, 406B, 406C; in other embodiments, the vertical dimension of the ellipses 406A, 406B, 406C changes in other directions or amounts or does not change at all.

Latency may exist between the time a tracked object moves and the time at which the cursor reacts on the screen 208. That is, the system 200 may require a certain amount of time to detect the movement of the tracked object with the cameras 102, process and recognize the gesture related to the movement with the processor 202, and send an update to the screen 208. This amount of time, referred to as the latency of the system 200, may be approximately 10-100 ms and may vary in response to the current level of processing power available on the processor 202, the refresh rate of the screen 208, or other factors. In one embodiment, the interactive object presentation module 226 stretches the cursor in accordance with the latency between a tracked movement of the object and the corresponding motion of the cursor. The stretching, by giving the appearance of faster motion, may lessen the amount of latency that the user perceives. In one embodiment, the amount of stretching is proportional to the current amount of latency. The system 200 may determine the latency by measuring some or all of it by, for example, measuring the current processing speed of the processor 202 or may use a predetermined or expected latency.

In one implementation, the system 200 changes a display property of the cursor based on the context of the cursor on the screen 208. If, for example, the area surrounding the cursor on the screen 208 is dark, the interactive object presentation module 226 may increase the brightness of the cursor to help the user identify or locate it or may decrease the brightness of the cursor so that it fits more naturally into its surroundings. Similarly, if the screen is bright, the interactive object presentation module 226 may increase or decrease the brightness of the cursor. The interactive object presentation module 226 may instead or in addition adjust the contrast or transparency (i.e., alpha level) of the cursor in response to the brightness of its surroundings.

The color, pattern, texture, and/or motion of the area surrounding the cursor on the screen 208 may also be used to change the display properties of the cursor. In one embodiment, the interactive object presentation module 226 analyzes any objects, applications, or backgrounds displayed on the screen 208 near the cursor and possibly the current display properties of the cursor itself to determine the degree of similarity there between. For example, the cursor may move to a region of the screen 208 having the same color as the cursor, and the user may experience difficulty in distinguishing the cursor from the similarly colored region. Likewise, the region of the screen 208 may have a similar pattern or texture as the cursor or, even if the cursor's pattern or texture is dissimilar, the pattern or texture of the region of the screen 208 may be complicated or confusing to the user. In one embodiment, the interactive object presentation module 226 alters the color, transparency, contrast, pulsing, flashing, or other property of the cursor to thereby aid the user in distinguishing the cursor from the region of the screen.

The interactive object presentation module 226 may change the responsiveness of the cursor based on the gesture and/or screen region near the cursor. In one embodiment, as the cursor nears an interactive element on the screen 208, the interactive object presentation module 226 decreases the sensitivity of the cursor with respect to the movement of the object. For example, if the cursor approaches a presented button, scrollbar, URL link, or any other such object, a gesture of a given length or rotation causes the cursor to move a shorter distance than it would otherwise (if, e.g., the cursor is not near such an interactive element). In one implementation, the gesture-recognition module 224 determines that the user intends to interact with the presented element based on the speed or direction of a detected gesture; in this implementation, the interactive object presentation module 226 "snaps" the cursor to the object and the cursor quickly or instantly moves to the presented element. The interactive object presentation module 226 may further treat the cursor as "sticky" once it moves to or interacts with the presented element and the cursor remains on or near the element until the user makes a gesture having a velocity, distance, or acceleration greater than a threshold.

In another implementation, the interactive object presentation module 226 causes the cursor to be displayed on the screen 208 using sub-pixel rendering or smoothing. The interactive object presentation module 226 may detect or receive physical properties of the display 208 (e.g., screen resolution and LED/OLED type) and use these properties to render sub-pixels on the display. The sub-pixel rendering may provide anti-aliasing to the cursor, thereby increasing the perceived resolution of the cursor.

The interactive object presentation module 226 may change the presentation property of the cursor based on past or predicted future movement of the real-world object. For example, if the cursor is used to rotate or move an element such as dial, scrollbar, or slider (or the cursor is a dial, scrollbar, or slider), the cursor or element may flash and/or change color when the element approaches its 25%, 50%, 75%, or 100% range of motion. If the cursor is moving toward an interactive element, the interactive object presentation module 226 may change the appearance of the cursor to indicate interaction with the element. For example, if the cursor is moving toward a URL link, it may turn blue to match the color of the link. In another embodiment, the interactive element flashes or changes color when the cursor moves toward it. The interactive object presentation module 226 may indicate past movement of the cursor by showing, e.g., a line that tracks the past movement.

Implementations may employed in a variety of application areas, such as for example and without limitation consumer applications including interfaces for computer systems, laptops, tablets, television, game consoles, set top boxes, telephone devices and/or interfaces to other devices; medical applications including controlling devices for performing robotic surgery, medical imaging systems and applications such as CT, ultrasound, x-ray, MRI or the like, laboratory test and diagnostics systems and/or nuclear medicine devices and systems; prosthetics applications including interfaces to devices providing assistance to persons under handicap, disability, recovering from surgery, and/or other infirmity; defense applications including interfaces to aircraft operational controls, navigations systems control, on-board entertainment systems control and/or environmental systems control; automotive applications including interfaces to automobile operational systems control, navigation systems control, on-board entertainment systems control and/or environmental systems control; security applications including, monitoring secure areas for suspicious activity or unauthorized personnel; manufacturing and/or process applications including interfaces to assembly robots, automated test apparatus, work conveyance devices such as conveyors, and/or other factory floor systems and devices, genetic sequencing machines, semiconductor fabrication related machinery, chemical process machinery and/or the like; and/or combinations thereof.

Implementations of the technology disclosed may further be mounted on automobiles or other mobile platforms to provide information to systems therein as to the outside environment (e.g., the positions of other automobiles). Further implementations of the technology disclosed may be used to track the motion of objects in a field of view or used in conjunction with other mobile-tracking systems. Object tracking may be employed, for example, to recognize gestures or to allow the user to interact with a computationally rendered environment; see, e.g., U.S. Patent Application Ser. No. 61/752,725 (filed on Jan. 15, 2013) and Ser. No. 13/742,953 (filed on Jan. 16, 2013), the entire disclosures of which are hereby incorporated by reference.

It should also be noted that implementations of the technology disclosed may be provided as one or more computer-readable programs embodied on or in one or more articles of manufacture. The article of manufacture may be any suitable hardware apparatus, such as, for example, a floppy disk, a hard disk, a CD ROM, a CD-RW, a CD-R, a DVD ROM, a DVD-RW, a DVD-R, a flash memory card, a PROM, a RAM, a ROM, or a magnetic tape. In general, the computer-readable programs may be implemented in any programming language. Some examples of languages that may be used include C, C++, or JAVA. The software programs may be further translated into machine language or virtual machine instructions and stored in a program file in that form. The program file may then be stored on or in one or more of the articles of manufacture.

Certain implementations of the technology disclosed were described above. It is, however, expressly noted that the technology is not limited to those implementations, but rather the intention is that additions and modifications to what was expressly described herein are also included within the scope of the technology disclosed. For example, it may be appreciated that the techniques, devices and systems described herein with reference to examples employing light waves are equally applicable to methods and systems employing other types of radiant energy waves, such as acoustical energy or the like. Moreover, it is to be understood that the features of the various embodiments described herein were not mutually exclusive and can exist in various combinations and permutations, even if such combinations or permutations were not made express herein, without departing from the spirit and scope of the technology disclosed. In fact, variations, modifications, and other implementations of what was described herein will occur to those of ordinary skill in the art without departing from the spirit and the scope of the technology disclosed.

What is claimed is:

1. A system comprising:
   a computer memory configured to store a digital representation of a path of a movement of two or more fingers of a user's hands tracked in a 3D space; and
   a processor implementing:
      presenting, on a presentation device, separate interactive objects, each separate interactive object being associated with a particular finger of two or more fingers, wherein a position of each presented interactive object changes in response to a movement of the associated finger of the two or more fingers; and
      determining a use mode for at least one of the presented interactive objects and modifying a first presentation property of the at least one of the presented interactive objects based on the use mode determined for the at least one of the presented interactive objects, wherein the use mode is determined based on an input from an application or an input from a user,
   wherein the use mode is determined to be one of:
      a first mode in which the at least one of the presented interactive objects moves but does not interact with any presented elements; and
      a second mode in which the at least one of the presented interactive objects interacts with a presented element, and
   wherein the at least one of the presented interactive objects is at least one of a cursor, a scrollbar, a slider, a knob and a button.

2. The system of claim 1, further comprising a display configured to display the presented interactive objects.

3. The system of claim 1, wherein the processor further implements modifying a second presentation property selected from a set consisting of a color, a size and a shape of at least one of the presented interactive objects based on a determined property of the movement.

4. The system of claim 3, wherein the modifying of the second presentation property of the at least one of the presented interactive objects comprises changing at least one of a color, a size, a shape, and a transparency of the at least one of the presented interactive objects.

5. The system of claim 3, wherein the modifying of the second presentation property of the at least one of the presented interactive objects comprises at least one of stretching the at least one of the presented interactive objects based on at least one of a velocity and an acceleration of at least one of the two or more fingers of the user's hands, changing a color of the at least one of the presented interactive objects based on at least one of the velocity and the acceleration of the at least one of the two or more fingers of the user's hands, and changing a color of the at least one of the presented interactive objects based on at least one of a color, a texture, and a pattern of a screen area along the path.

6. The system of claim 3,
   wherein the processor further implements detecting that the path of the movement does not correspond to a known gesture, and
   wherein the modifying of the second presentation property of the at least one of the presented interactive objects comprises changing a color of the at least one of the presented interactive objects in response to detecting that the path of the movement does not correspond to the known gesture.

7. The system of claim 1, wherein the processor further implements detecting a presented element to which at least one of the presented interactive objects is moving towards and changing a color of at least one of the presented interactive objects to indicate interaction with the presented element.

8. A method comprising:
   storing, in a computer memory, a digital representation of a path of a movement of two or more fingers of a user's hands tracked in a 3D space;
   presenting, on a presentation device, separate interactive objects, each separate interactive object being associated with a particular finger of two or more fingers, wherein a position of each presented interactive object changes in response to a movement of the associated finger of the two or more fingers; and
   determining a use mode for at least one of the presented interactive objects and modifying a first presentation property of the at least one of the presented interactive objects based on the use mode determined for the at least one of the presented interactive objects, wherein the use mode is determined based on an input from an application or an input from a user,
   wherein the use mode is determined to be one of:
      a first mode in which the at least one of the presented interactive objects moves but does not interact with any presented elements; and
      a second mode in which the at least one of the presented interactive objects interacts with a presented element, and
   wherein the at least one of the presented interactive objects is at least one of a cursor, a scrollbar, a slider, a knob and a button.

9. The method of claim 8, further comprising displaying, on a display, the presented interactive objects.

10. The method of claim 8, further comprising modifying a second presentation property selected from a set consisting of a color, a size, and a shape of at least one of the presented interactive objects based on a determined property of the movement.

11. The method of claim 10, wherein the modifying of the second presentation property of the at least one of the presented interactive objects comprises changing at least one of a color, a size, a shape, and a transparency of the at least one of the presented interactive objects.

12. The method of claim 10, wherein the modifying of the second presentation property of the at least one of the presented interactive objects comprises at least one of:
   stretching the at least one of the presented interactive objects based on at least one of a velocity and an acceleration of at least one of the two or more fingers of the user's hands,
   changing a color of the at least one of the presented interactive objects based on at least one of the velocity and the acceleration of the at least one of the two or more fingers of the user's hands, and
   changing a color of the at least one of the presented interactive objects based on at least one of a color, a texture, and a pattern of a screen area along the path.

13. The method of claim 10, further including detecting that the path of the movement does not correspond to a known gesture,
   wherein the modifying of the second presentation property of the at least one of the presented interactive objects comprises changing a color of the at least one of the presented interactive objects in response to detecting that the path of the movement does not correspond to the known gesture.

14. The method of claim 8, further including detecting a presented element to which at least one of the presented interactive objects is moving towards and wherein the modifying of the first presentation property of the at least one of the presented interactive objects to indicate interaction with the presented element.

15. The method of claim 8, wherein at least one of the presented interactive objects is presented in a first color when the at least one of the presented interactive objects is in a first use mode; and
   the at least one of the presented interactive objects is presented in a second color when the at least one of the presented interactive objects is in a second use mode, wherein the first and second colors are visually distinct.

16. The method of claim 8, further including selecting a current use mode based upon a user's pattern of action.

17. The method of claim 8, further including selecting a current use mode based upon a command received from a running application.

18. The method of claim 8, further including selecting a current use mode based upon a command received from a user.

19. The method of claim 8, further including clicking on the presented element when the at least one of the presented interactive objects interacts with the presented element.

20. A method comprising:
   storing, in a computer memory, a digital representation of a path of a movement of two or more fingers of a user's hands tracked in a 3D space for presentation on a screen;
   determining a current use mode for a presented interactive object displayed on the screen and associated with one of the two or more fingers as being an action mode, in which the presented interactive object interacts with a presented element displayed on the screen but does not move from the presented element, wherein the determination of the current use mode is in response to a command from a running application; and
   modifying a first presentation property of the presented interactive object based on the determined current use mode of the presented interactive object;
   wherein, when the determined current use mode is the action mode, the presented interactive object interacts with a presented element displayed on the screen in response to a user command by at least one of the two or more fingers of the user's hands,
   wherein the presented interactive object is presented in a first color when the presented interactive object is in a first use mode, the presented interactive object is presented in a second color when the presented interactive object is in a second use mode, and wherein the first and second colors are visually distinct, and
   wherein the presented interactive object is at least one of a cursor, a scrollbar, a slider a knob and a button.

* * * * *